(12) United States Patent
Yu et al.

(10) Patent No.: US 10,156,477 B2
(45) Date of Patent: Dec. 18, 2018

(54) INTELLIGENT ALIGNMENT SYSTEM AND METHOD FOR COLOR SENSING DEVICES

(71) Applicant: Variable, Inc., Chattanooga, TN (US)

(72) Inventors: George Yang Yu, Chattanooga, TN (US); Andrew Richard Temple, Chattanooga, TN (US); Jeff McGehee, Chattanooga, TN (US)

(73) Assignee: Variable, Inc., Chattanooga, TN (US)

( * ) Notice: Subject to any disclaimer, the term of this patent is extended or adjusted under 35 U.S.C. 154(b) by 0 days.

(21) Appl. No.: 15/032,335

(22) PCT Filed: May 1, 2015

(86) PCT No.: PCT/US2015/028861
§ 371 (c)(1),
(2) Date: Apr. 27, 2016

(87) PCT Pub. No.: WO2016/178653
PCT Pub. Date: Nov. 10, 2016

(65) Prior Publication Data
US 2017/0131147 A1 May 11, 2017

(51) Int. Cl.
*G01J 3/46* (2006.01)
*G06N 3/08* (2006.01)
(Continued)

(52) U.S. Cl.
CPC ............. *G01J 3/462* (2013.01); *G01J 3/0264* (2013.01); *G01J 3/0272* (2013.01); *G01J 3/465* (2013.01);
(Continued)

(58) Field of Classification Search
CPC ........ H04N 1/60; H04N 9/735; H04N 17/002; G01J 3/524; G01J 3/462; G01J 3/46; G06T 7/90; G06T 2207/10024; G06K 9/4652
(Continued)

(56) References Cited

U.S. PATENT DOCUMENTS 6,480,299 B1 11/2002 Drakopoulos et al.
6,584,435 B2 6/2003 Mestha et al.
(Continued)

FOREIGN PATENT DOCUMENTS

CN 101055206 10/2007
EP 525964 A2 2/1993
(Continued)

OTHER PUBLICATIONS

Nektarios A. Valous et al., "Colour Calibration of a Laboratory Computer Vision System for Quality Evaluation of Pre-sliced Hams," Meat Science, Jan. 31, 2009, vol. 81, Issue 1, pp. 132-141.
(Continued)

*Primary Examiner* — Janet L Suglo
*Assistant Examiner* — Jeffrey P Aiello
(74) *Attorney, Agent, or Firm* — Patterson Intellectual Property Law, P.C.; Gary L. Montle

(57) ABSTRACT

A computer-implemented intelligent alignment method for a color sensing device (12) which initially obtains a raw sense value measured by the color sensing device and converts the raw sense value to a tristimulus value (S401). The color sensing device may be calibrated using a known set of colors (S402). Raw readings received from the color sensing device may be mapped to known tristimulus values (S403), and mapped values may be converted to a standard reference illuminant color space (S404). A client-server system may be provided in which a color sensing device and one or more
(Continued)

servers collectively execute operations according to the present disclosure.

16 Claims, 6 Drawing Sheets

(51) Int. Cl.
*G01J 3/02* (2006.01)
*G01J 3/50* (2006.01)
*G01J 3/52* (2006.01)

(52) U.S. Cl.
CPC .............. *G01J 3/50* (2013.01); *G01J 3/524* (2013.01); *G06N 3/08* (2013.01); *G01J 2003/467* (2013.01)

(58) Field of Classification Search
USPC ........ 382/159, 165, 167; 702/85; 348/223.1; 358/1.9
See application file for complete search history.

(56) References Cited

U.S. PATENT DOCUMENTS

| | | | |
|---|---|---|---|
| 6,649,416 B1* | 11/2003 | Kauer | G01N 21/6428 422/82.06 |
| 7,283,238 B2 | 10/2007 | Simons et al. | |
| 7,557,925 B2 | 7/2009 | Nisper et al. | |
| 7,944,561 B2 | 5/2011 | Nisper et al. | |
| 8,008,613 B2 | 8/2011 | Tam | |
| 8,139,220 B2 | 3/2012 | Peterson et al. | |
| 8,237,138 B2 | 8/2012 | Nisper et al. | |
| 8,271,021 B2 | 9/2012 | Jeong | |
| 9,070,192 B1* | 6/2015 | Smith | G06K 9/4652 |
| 9,111,350 B1* | 8/2015 | Mukherjee | G06T 7/0075 |
| 2002/0122044 A1* | 9/2002 | Deering | G06F 3/1431 345/597 |
| 2002/0159066 A1 | 10/2002 | Berstis | |
| 2002/0184168 A1 | 12/2002 | McClanahan et al. | |
| 2004/0141213 A1* | 7/2004 | Kleiman | H04N 1/484 358/474 |
| 2005/0018191 A1 | 1/2005 | Luo et al. | |
| 2005/0151974 A1* | 7/2005 | Butterfield | H04N 1/00058 356/448 |
| 2005/0275912 A1 | 12/2005 | Chen et al. | |
| 2007/0035554 A1 | 2/2007 | McClanahan | |
| 2008/0013077 A1 | 1/2008 | Orelli et al. | |
| 2008/0136836 A1* | 6/2008 | Edge | H04N 1/6052 345/600 |
| 2008/0259336 A1 | 10/2008 | Konno et al. | |
| 2010/0295942 A1 | 11/2010 | Jekel | |
| 2011/0050892 A1 | 3/2011 | Zind et al. | |
| 2011/0075146 A1 | 3/2011 | Moroney et al. | |
| 2011/0215997 A1 | 9/2011 | Kim | |
| 2012/0129269 A1 | 5/2012 | Choi et al. | |
| 2012/0250020 A1 | 10/2012 | Hastings et al. | |
| 2013/0042295 A1 | 2/2013 | Kelly et al. | |
| 2013/0050703 A1 | 2/2013 | Shannon et al. | |
| 2014/0022410 A1* | 1/2014 | Gish | H04N 1/60 348/223.1 |
| 2014/0111807 A1 | 4/2014 | Yin et al. | |
| 2015/0215312 A1* | 7/2015 | Cesnik | H04L 9/3271 726/9 |
| 2016/0048739 A1* | 2/2016 | Burg | G06T 7/90 382/128 |
| 2016/0253466 A1* | 9/2016 | Agaian | G06N 3/0427 382/128 |

FOREIGN PATENT DOCUMENTS

| | | |
|---|---|---|
| JP | 2012065192 | 3/2012 |
| KR | 20070111671 | 11/2007 |
| WO | 2014071302 A1 | 5/2014 |

OTHER PUBLICATIONS http://spyder.datacolor.com/portfolio-view/spyder4elite/ obtained from https://archive.org/web/ as it appeared on Apr. 7, 2012.
http://www.hitechnic.com/cgi-bin/commece.cgi?preadd=-action&key=NC01038 (available Jul. 27, 2015).
http://www.emxinc.com/industrial.html (accessed Jul. 27, 2015).
Brian Heater: "Node Modular iOS Sensor Hands-On", Oct. 20, 2012, XP002763666, 6 pp., retrieved from the Internet on Oct. 31, 2016.
Supplementary European Search Report in European Patent Application No. EP 13 85 0063, dated Oct. 31, 2106, 11 pp.
State Intellectual Property Office, P.R. China: First Office Action dated May 3, 2016 in re: Patent Application No. 2013800624943.0, filed Nov. 4, 2013.
Korean Intellectual Property Office—International Application Division, Notification of Transmittal of the International Search Report and the Written Opinion of the International searching Authority, PCT/US2015/028861, dated Jan. 27, 2016, 10 pages.
European Search Report for corresponding application No. EP 15 89 1344, dated Aug. 17, 2018, 10 pp.

* cited by examiner

INTELLIGENT ALIGNMENT SYSTEM AND METHOD FOR COLOR SENSING DEVICES

TECHNICAL FIELD

The present disclosure relates generally to color measurement and calibration. More particularly, the present disclosure relates to a computer-implemented intelligent alignment method for a color sensing device which initially obtains a raw sense value measured by the color sensing device and a computer system configured to implement the computer-implemented intelligent alignment method.

BACKGROUND ART

Designers, painters, contractors, photographers, and, in general, anyone interested in looking for an accurate color information may find the current range of color measurement tools to be limited, bulky, or lacking in convenience. One concern with color measurement tools is how to effectively calibrate color readings for consistency and accuracy. In some systems, an initial calibration may be performed at a time of manufacture. However, such a system is not capable of verifying consistency or accuracy after the device is initially calibrated.

The primary tools for measuring light (color) are colorimeters and spectrometers. Colorimeters include various types, including but not necessarily limited to RGB sensor based, tristimulus sensor based, and multi filter based colorimeters.

When measuring color, the goal for all of these systems is to convert from a sensed set of values into standard CIE color space values (e.g., XYZ, Lab, xyY), and then further color applications can be applied after this (e.g., paint matching, RGB color coding, etc.).

Spectrometers measure color by separating a measured lightwave into wavelength segments, and then integrating over these segments using standard observer curves to transform from wavelength into the standard CIE color space.

Colorimeters go about solving the same problem via a combination of light filters and/or light sources. In the case of a colorimeter that uses an RGB filters (which sense light across spectrum frequencies that roughly represent red, green, and blue), the colorimeter illuminates an object, and then reads back a sense value from the RGB filters. The values provided by the RGB sensor are not very useful until converted into a standard color space.

Tristimulus sensor based colorimeters work in a similar fashion, but the wavelengths covered by the filters are meant to closely follow those of the standard observer curves. Even with output from the tristimulus sensor mimicking the standard observer curves, some level of calibration/conversion is still needed to accurately represent color values (and also account for device to device differences). This is also the case for spectrometers.

When comparing the difference in the way these types of sensors measure color (or comparing the difference in two colors in general), a color difference standard known as $\Delta E$ is most typically used. This is a special form of color space "distance" which has been developed by CIE to mimic the way the human eye perceives color difference. The process for converting from sense values and minimizing the $\Delta E$ between sensor readings and a standard color value is where instrument calibration and setup becomes important, and will heavily impact the accuracy of a color measurement tool.

One known problem with colorimeters is that they lack the specificity of a spectrophotometer due to much fewer independent measurable parameters in the optical spectrum (i.e., an RGB colorimeter might only measure R, G, and B, whereas a spectrophotometer can record high resolution reflectance curves over the visible spectrum). Inherent design differences such as optics, stimulation sources, and detector responses make colorimeters produce a different result from a spectrophotometer and from other colorimeters.

Because of the aforementioned specificity (and greater perceived accuracy), spectrophotometer measurements are often used as reference standard. Interestingly, there does exist variation between any two spectrophotometers, and it is a common practice to calibrate a spectrophotometer to match the readings of a given reference spectrophotometer. The calibrated accuracy of this device will then be based on its conformance to the reference device.

More generally, all color measurement devices are judged based on their conformance to some reference device. Therefore, the challenge in the development of a color sensing device is to find a method that allows for the device to align with a given reference device.

DISCLOSURE OF THE INVENTION

Though color measurement accuracy depends on the alignment between a given color sensing device and a reference device, a solution to this problem as presented herein allows for the alignment of a color measurement device to any reference color measurement device. In one particular embodiment, the reference device used in the testing and development of this method may be a high-end benchtop spectrophotometer. However, it will be shown that the disclosed methodology is independent of any particular reference device.

Exemplary embodiments consistent with the present disclosure may include a computer-implemented intelligent alignment method for a color sensing device which initially obtains a raw sense value measured by the color sensing device. The raw sense value may be converted to a tristimulus value. The color sensing device may be calibrated using a known set of colors. Raw readings received from the color sensing device may be mapped to known tristimulus values, and mapped values may be converted to a standard reference illuminant color space.

Other exemplary embodiments may include a client-server system in which a color sensing device and one or more servers may collectively execute operations according to the present disclosure.

Numerous other objects, features, and advantages of the present disclosure will be readily apparent to those skilled in the art upon a reading of the following disclosure when taken in conjunction with the accompanying drawings.

BEST MODE FOR CARRYING OUT THE INVENTION

Figure 1:
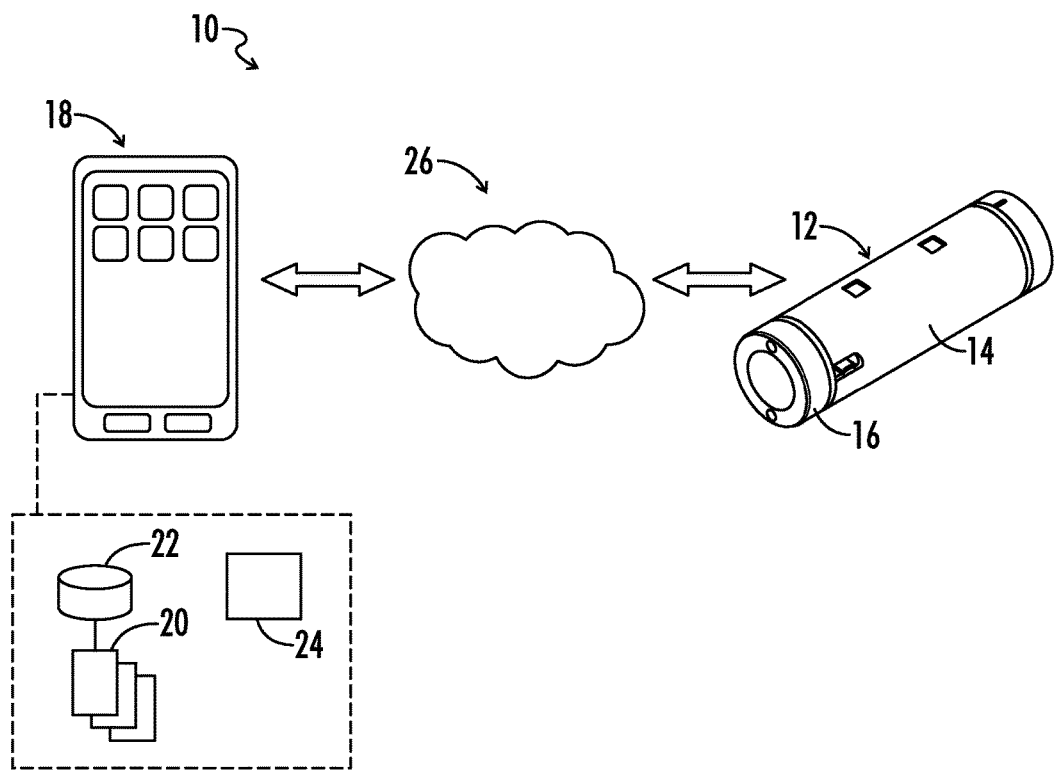
FIG. 1 is a diagram representing an exemplary color sensing system implementing a color sensing device.

Referring generally to FIGS. 1-11, a computer-implemented intelligent alignment system and for a color sensing device which initially obtains a raw sense value measured by the color sensing device according to the present disclosure may now be described in greater detail. Where the various figures may describe embodiments sharing various common elements and features with other embodiments, similar elements and features are given the same reference numerals and redundant description thereof may be omitted below.

An exemplary color sensing system 10 as represented in FIG. 1 may include without limitation a color sensing device 12 formed by a combination of a base module 14 and at least a color sensing module 16, and a computer program product 20. The program product (i.e., program instructions) may reside generally on a computer readable medium of a user computing device (e.g., typically a mobile computing device such as a smartphone or tablet computer, but also including a desktop computer, etc.) remote from the aforementioned modules or otherwise accessible by and executable from the mobile computing device. As further described below, the program product may be downloadable from a host server (not shown) to the user computing device in its entirety, or in various embodiments may be a distributed program product including one or more program modules executable from the user computing device 18 and one or more program modules executable from the host server via a communications network 26. The user computing device 18 may comprise a processor 24 configurable to execute program modules, and may further comprise storage 22.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

A color sensing device 12 of the present disclosure may be defined by the color sensing module 16 alone or a combination of the base 14 and color sensing modules 16 via direct coupling of the color sensing module 16 to the base module 14. In an embodiment, the base module enables remote communications to and from the color sensing module with respect to the user computing device 18. The base module may further define a base, processing unit, communications interface and/or power supply for any one or more of a plurality of sensing modules that may be detachably coupled to the base module at any given time.

In one embodiment, the color-sensing module 16 may be a Chroma™ sensor module selected from a family of sensor modules offered by Variable, Inc. for use with a base module (or host module), which may be a NODE™ device also as offered by Variable, Inc.

In an embodiment, the color sensing module 16 further comprises a CryptoAuthentication chip or an equivalent as known in the art, which enables restricting use of the color sensing module 16 with respect to the base module 14 or any other proprietary system as desired. This chip may also further enable storage of unique calibration information for each color sensing device 12.

Figure 2:
FIG. 2 is a diagram representing a cloud-based color sensing system according to exemplary embodiments of the present disclosure.

Alternatively, or in conjunction with the CryptoAuthentication chip, embodiments consistent with the present disclosure may variously utilize a cloud client 210 and/or cloud service 220 communicatively connected to network 26, as illustrated at FIG. 2, in order to access, store, and/or transmit data within the spirit and scope of the disclosure. For example, in one embodiment, a color sensing device 12 may function as a cloud client 210 and may submit data to cloud service 220 for processing. Alternatively, a cloud service 220 may store parameters associated with cloud client 210 or may perform processing related to parameters associated with cloud client 210 which are transmitted to cloud client 210 for use in color calibration and/or processing. As such, both the cloud client 210 and cloud service 220 may, in various embodiments, perform the roles of either clients or servers depending upon a particular implementation.

As previously noted, the base module 14 may in one embodiment be a NODE unit as offered by Variable, Inc. The base module 14 in this embodiment is an intermediate hardware component with a microprocessor and communication peripherals that handle Bluetooth communication with a user device 18 such as a smartphone or the like. Different sensing modules, including for example Chroma, can be connected to the base module 14 and may be structurally interchangeable with each other while maintaining distinct sensing functions.

In one embodiment, the color sensing device 12 may include a color sensing module 16 and a base module 14 having associated motion sensing functionality. A color sensing method of the present disclosure may accordingly only be enabled when the base module verifies that the color sensing device is stationary and thereby assure more accurate color measurements.

In one embodiment, the color sensing device 12 may include a color sensing module 16 and an air temperature sensing module (not shown) both interchangeably connectable to either of a plurality of connection ports on the base module 14, wherein the color sensing system may have an enhanced color measurement method based further upon a sensed ambient temperature. In a particular embodiment, the temperature sensing module is a Clima device as offered by Variable, Inc. which is further effective to sense barometric pressure, ambient light, humidity, etc., representative outputs for each of which may supplement color measurements or otherwise be displayed on the user device.

A computer program product of a color sensing system 10 of the present disclosure may comprise computer instructions residing on a non-transitory computer-readable medium in a computing device such as for example a smart phone or tablet computer. Alternatively, the computer program product may reside in a non-transitory computer-readable medium such as a server system remote from the computing device but communicatively linked to the computing device such that execution of the computer program product directs the performance of a color sensing, storage and comparison method according to the present disclosure, at least part of which includes steps for generating a user interface on a display of the computing device and receiving user input regarding, e.g., various display parameters.

In an exemplary embodiment, the computer program product may be or include the Chroma smartphone application as provided by Variable, Inc., which enables many unique features including base module (i.e., NODE) connectivity, color sensing, color display, color comparison, color information storage, history lookup, and others as listed in the sections below.

Figure 3:
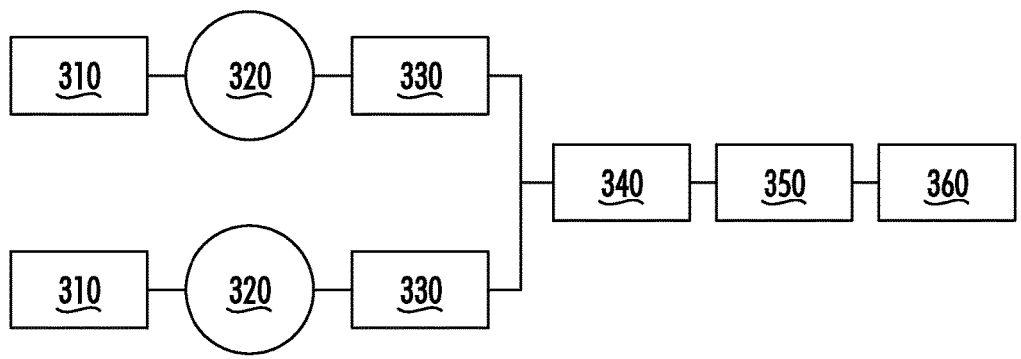
FIG. 3 is a diagram representing relationships between components of a color sensing system according to exemplary embodiments of the present disclosure.

FIG. 3 illustrates relationships between components according to an exemplary embodiment of the present disclosure. In one embodiment, matching tables 310 may be associated with one or more batches 320. Matching tables 310 may comprise data correspondence information, such as conversion or mapping information between color spaces or reference data. Each batch 320 may comprise at least one color sensing device 12 having an individual sensor calibration, and may, in one embodiment, be configured to group a plurality of color sensing devices 12 according to an associated ΔE value. As understood in the art, a ΔE value is a color difference standard which traditionally refers to a color space "distance" related to a perceived color difference when viewed by a human eye.

In one embodiment, each batch 320 may be associated with an absolute adjustment 330. An absolute adjustment 330 may be used to align a color sensing device 12 to a specified reference device 350 by establishing a relationship between the devices. This relationship may be modeled as a mathematical function where the input is an unadjusted color reading of a device to be aligned, and the output is a color reading of a reference device 350 corresponding to data stored in matching table 360. This mathematical function may correspond to equation 1.

$$SCAN_{ref} = f(SCAN_{device}) \quad \text{(Eq. 1)}.$$

Due to the potential complexity of this function, it may be difficult to find it though pure mathematical techniques. In one embodiment, this difficulty may be overcome by restructuring the problem into a supervised learning problem, for which a function approximation algorithm may be used.

As understood in the art, supervised learning is a branch of machine learning in which a learning algorithm is presented a set of inputs and the corresponding correct outputs. The algorithm may then "learn" the relationship between these inputs and outputs and produces a model that can be used to predict future unknown data based on the data it has been trained to learn. Therefore, the strategies presented herein may, in various embodiments, involve obtaining unadjusted color data and reference device data for a specially formulated set of colors. This data may then be used to create a model that approximates the function represented in Eq. 1. Transformed color readings after absolute adjustment may be referred to as adjusted color readings.

The system illustrated by FIG. 3 may include a Secondary Adjustment 340. Secondary Adjustment 340 may, in one embodiment, comprise a measurement surface adjustment.

Accurate measurement of color requires that a color sensing device 12 illuminates a measurement surface with a known light source and captures the portion of this light reflecting off the surface. The reflection of this light may vary not only based on color, but also based on surface texture and translucency of the substrate. It is very likely that the desired reference device 350 may capture light from a rough surface texture differently from an unaligned color sensing device 12.

These effects may be minimal for subtly textured surfaces, but some materials such as brick or carpet can be so porous that they will greatly affect the response of reflected light. In order to accurately align with the reference device for a given surface texture, a Secondary Adjustment 340 may be used in series after an Absolute Adjustment 330. This allows the Absolute Adjustment 330 to make modifications needed to align a color sensing device 12 with the reference device 350 over the visible gamut and the Secondary Adjustment 340 to handle any sort of shift that may occur due to surface texture.

In addition to Secondary Adjustment 340 for surface textures, it is also possible in one exemplary embodiment to circumvent any true alignment, and to build a database of unadjusted color readings for a given colorset. This may then be used to simply "match" unknown scans to the closest known color in the database.

In one embodiment, a Secondary Adjustment 340 may comprise Artificial Neural Network (ANN) processing. ANN processing may be implemented, for example, on a small set of different material types with less than 200 training examples per material, and in such implementation has proven to greatly improve the alignment between a learning device and the reference device 350. The above-described method of performing Secondary Adjustment 340 may be developed for a plurality of any material/surface types, using only a few training samples for each material/surface type.

In one exemplary embodiment, because of linearity of implemented common color sensing chips, device calibration may be performed a priori in order to convert raw sense values to CIE XYZ (e.g., tristimulus) values using the least squares projection (equation 2).

$$Ax = B \quad \text{(Eq. 2)}.$$

A color device may be calibrated by scanning a small known set of colors (e.g., 20-30) that is roughly representative of the standard color gamut.

Scanned raw readings may be mapped to known tristimulus values in order to create a standard sense to tristimulus mapping for a color device. These mapped values may then be converted to a standard reference illuminant color space (e.g., D50 or D65) using chromatic adaptation from the measured reflectance curve of a color device's illuminant to D50/D65, for example by use of the Bradford method. In this exemplary embodiment, calibrated device readings in a standard color space may be referred to as unadjusted color readings.

Further production precision may be added by reducing device-to-device variation via batching. Batching may use a representative "batching colorset" that is greater than or equal to the number of colors in the initial a priori calibration colorset and also represents the full color gamut. Devices may be grouped together based on a maximum allowed device-to-device ΔE for each color across the batching colorset. With this, batches 320 of color sensing devices 12 may be created with known unit-to-unit consistency. Once color sensing devices 12 are batched to a known maximum ΔE, representative color sensing device(s) 12 from the batch may be scanned using any of a plurality of methods in order to maximize accuracy for all color sensing devices 12 in the batch 320, for example, by means of Absolute Adjustment 330 described above.

Embodiments consistent with the present disclosure may include a designated color set that covers the visible color gamut uniformly using a reduced number of colors. For example, in one embodiment, the Variable 7300 training color set may be used, which implements only 7383 colors. Uniformity of the color set over the visible spectrum increases a designated color set's effectiveness in building a set of supervised learning training data. A designated color set may be realized in four general forms: A theoretical model, a printed representation of the theoretical model, and a digital representation of the printed model as measured by a reference device 350, and a digital representation of the printed model as measured by a color sensing device 12. To build a supervised learning training set, the designated color set (e.g., Variable 7300) as measured by a color sensing device 12 may be paired with the same designated color set as measured by a desired reference device 350.

Figure 4:
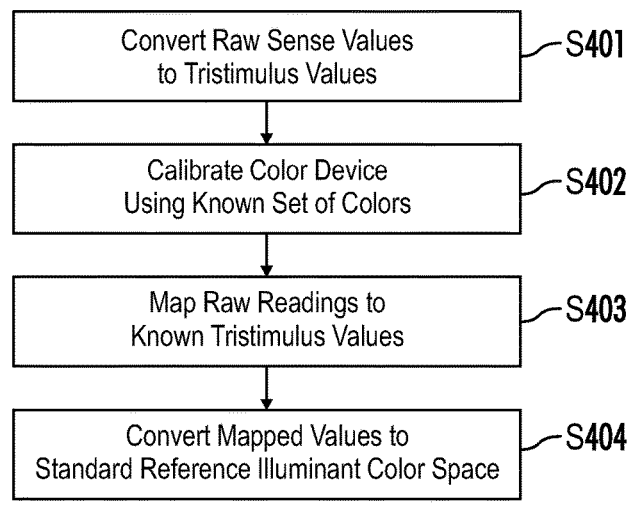
FIG. 4 is a flowchart representing an exemplary method for implementing a priori estimation in a color sensing system according to the present disclosure.

An exemplary embodiment of a priori estimation is illustrated at FIG. 4. At step S401, raw sense values received from a color sensing device 12 may be converted to tristimulus values, such as CIE XYZ values or the like. At step S402, a color sensing device 12 may be calibrated using a known set of colors. The known set of colors may include any of a subset of colors of the color gamut. In one embodiment, the known set of colors may comprise the Variable 7300 color set or at least a portion thereof. Step S403 maps raw readings to known tristimulus values. Finally, at step S404 the mapped values are converted to a standard reference illuminant color space. The standard illuminant color space may comprise, for example, the D50 and/or D65 illuminant color spaces, or the like.

Figure 5:
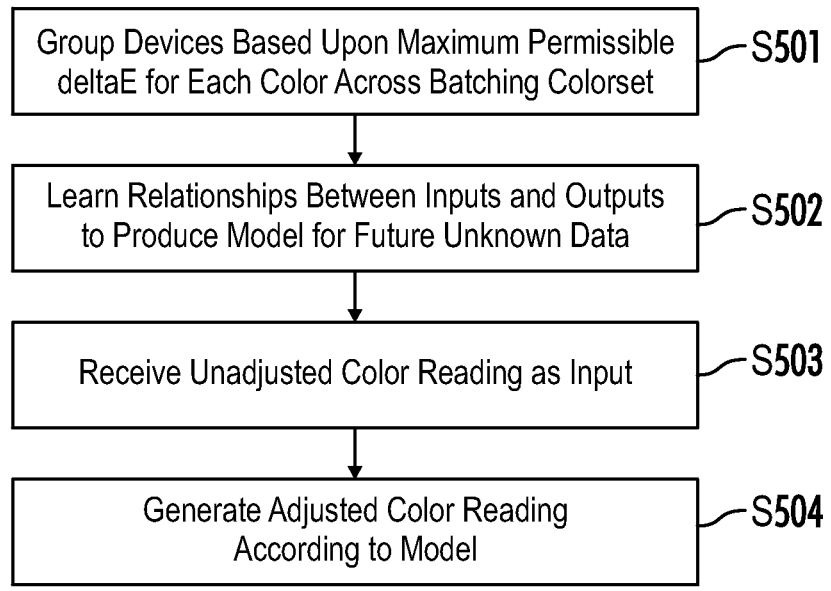
FIG. 5 is a flowchart representing an exemplary method for implementing an absolute adjustment in a color sensing system according to the present disclosure.

FIG. 5 provides an exemplary implementation of an Absolute Adjustment process in accordance with the above-described Absolute Adjustment 330. The process begins at step S501, where devices are grouped based upon a maximum permissible ΔE for each color across a batching colorset. At step S502 relationships are learned between inputs and output in order to produce a model for future unknown data. An unadjusted color reading is received as an input at step S503, and an adjusted color reading is generated at step S504 according to the produced model.

In one embodiment, the entire supervised training set of raw scans and reference scans may be stored in a database. When an unadjusted color reading needs to be aligned, a machine learning technique may be used (for example, a K Nearest Neighbor, Artificial Neural Network, or other machine learning technique may be used). In one embodiment, a K Nearest Neighbor (KNN) algorithm may search through the database for the K nearest scans to the unadjusted color reading. The KNN algorithm may then return a weighted average of the K corresponding reference scans. The results of the KNN algorithm are extremely accurate for colors in or near the designated color set. However, this method loses accuracy when predicting colors that are not near a color in the designated color set.

Figure 6:
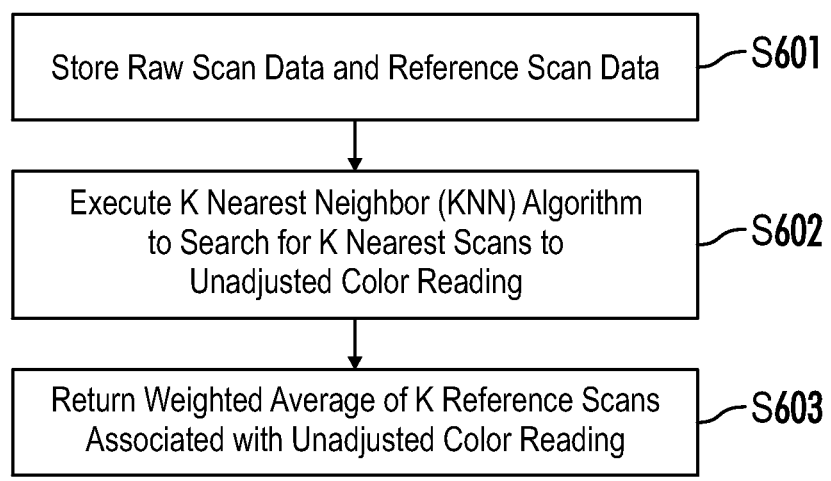
FIG. 6 a flowchart representing an exemplary method for implementing a K-nearest neighbor (KNN) algorithm in a color sensing system according to the present disclosure.

An exemplary process consistent with the above-noted KNN algorithm implementation is illustrated at FIG. 6. At step S601 of FIG. 6, raw scan data and reference scan data are stored. At step S602 a KNN algorithm is executed to search for K nearest scans to an unadjusted color reading. Finally, a weighted average of K reference scans associated with unadjusted color readings is returned at step S603.

In another embodiment, a subset of the designated color space (e.g., Variable 7300) may be scanned to create a supervised learning training set. This set may be used to train an Artificial Neural Network (ANN). An ANN is a machine learning method that is capable of estimating very complex functions present in the training set. The ANN may be trained in one embodiment by using the standard gradient-descent backpropagation algorithm.

The results of this method are not as accurate as the lookup table for colors on or near the designated color set, but accuracy may be greatly improved for all other colors. In practice, it has been shown that the training set used to train the ANN can be reduced tenfold without a major deterioration in performance. The ANN proves to do a better job providing a continuous representation of the color sensing device 12's error when compared to the KNN method. It is also advantageous that the number of reference scans needed for this method is one tenth of the KNN method, which may greatly reduce production cost.

Figure 7:
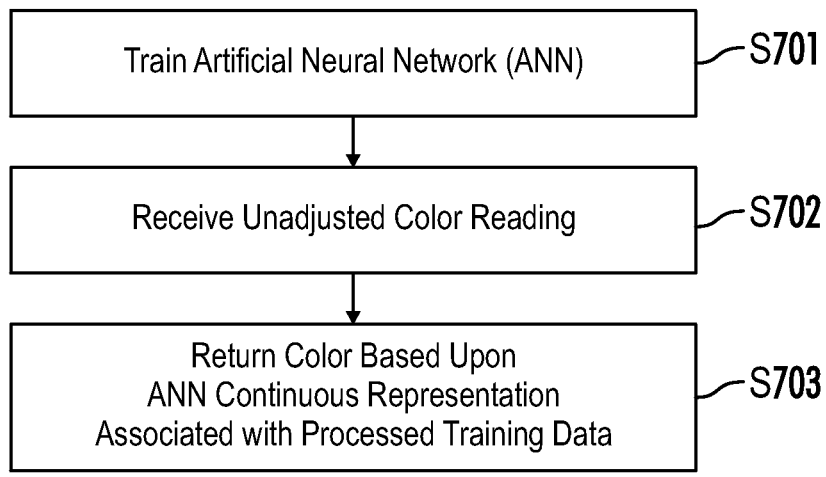
FIG. 7 is a flowchart representing an exemplary method for implementing an Artificial Neural Network (ANN) algorithm in a color sensing system according to the present disclosure.

An exemplary implementation of the above-described ANN algorithm is illustrated by FIG. 7, which begins at step S701 by training an ANN. At step S702 an unadjusted color reading is received. A color is returned by the ANN algorithm based upon an ANN continuous representation associated with processed training data at step S703.

Figure 8:
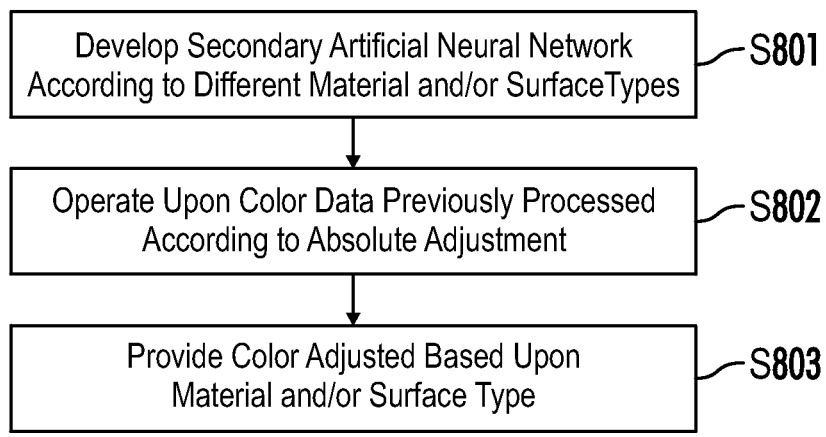
FIG. 8 is a flowchart representing an exemplary method for implementing a secondary adjustment in a color sensing system according to the present disclosure.

FIG. 8 provides an exemplary implementation of Secondary Adjustment 340 according to one embodiment of the present disclosure. Step S801 of FIG. 8 provides that a secondary ANN is developed according to different material types and/or surfaces. At step S802 color data previously processed according to Absolute Adjustment 330 is operated upon. At step S803 a color is provided which has been adjusted based upon a material and/or surface type.

A cloud-based system may allow for the above-noted techniques to be distributed to a large number of devices. As can be seen in FIG. 3, a cloud service may scalably package all of the calibration, batching, adjustment methods, and advanced mathematics and allow the alignment methods to be accessed by an end user of the color sensing device 12. Also, it may permit implementation of a relatively simple color "match" service that can be performed with unadjusted color readings or with fully aligned readings.

If a given color sensing device 12 has high precision, but lacks alignment with its reference device, a matching service can be created by simply obtaining a library of unadjusted CIE Standard color readings of the desired objects/colors to match. Upon a request for the nearest match (a smallest ΔE may be used to represent color similarity as seen by the human eye) to a real-world scan, the system must only compare its unadjusted scan with the desired library of raw readings and return the identity of the nearest match. The data for this method is represented by matching tables 310 of FIG. 3.

The above-described method may be effective for almost any type of color/surface texture combination, but has two potential weaknesses. First, it is missing the ability to give a reading that is accurately aligned to the reference device 350. It is easy for the color sensing device 12 to recognize that it has "seen" a similar color before, and to give a user the information regarding that similar color, but the color sensing device 12 does not know how the reference device 350 will measure that color. Lastly, since this takes place before the Absolute Adjustment 330, it requires that a library is created for each batch 320 of devices (see FIG. 3). This can be very expensive from a production perspective.

One solution to these two problems (made possible by the accuracy improvements of the ANN), is to build reference libraries after the Absolute Adjustment 330 and Secondary Adjustment 340 methods. Once batch-specific Absolute Adjustment 330 and Secondary Adjustment 340 have been applied, all color sensing devices 12 align with each other and the reference device 350. From this point, it can be seen that a color sensing device 12 will be able to provide a reference-aligned reading, and a single reference library will work for every batch 320 of color sensing devices 12. It is worth noting that, as described above, reference device 350 is not limited to a particular device. Rather, any device may be defined as the reference device 350 in accordance with the present disclosure.

Once all the data needed to build an alignment model for a single color sensing device 12 has been obtained, it must be able to be accessed by the color sensing device 12 itself. The data could be stored in direct memory on the color sensing device 12. However, one concern would be whether new alignment methods could be created which cause the color sensing device 12 to become obsolete. It would be extremely inefficient to update individual devices to work with the new alignment methods.

As mentioned above, one solution to this is to implement an embodiment which is configured to store, maintain, and update this data in a cloud database that can be accessed by a color sensing device 12, for example via an internet-connected client device. A database according to this exemplary embodiment may be utilized in two main ways, each naturally requiring some level of internet connectivity to access the cloud database. Currently, Bluetooth radio technology may permit devices to interface with one or more internet connected client devices which may be configured to act as a cloud client 210. Alternatively, a color sensing device 12 may comprise onboard internet connectivity which permits the color sensing device 12 to act as its own cloud client 210. Alternatively, or in conjunction with these exemplary embodiments, a color sensing device 12 may comprise onboard internet connectivity permitting the color sensing device to connect to an external device which functions as a cloud client 210 or a cloud service 220.

A cloud client 210 may interact with a cloud service 220 in a plurality of manners. In one embodiment, the cloud client 210 may connect to a cloud service 220. The color sensing device 12 may be connected to an internet enabled device that will act as the cloud client 210. The color sensing device 12 may relay its unique ID to the cloud service 220 via the cloud client 210. The cloud service 220 may respond with alignment data that is unique to the color sensing device 12. This information may be stored at the internet enabled device, where a software application may perform processing to utilize the alignment data and process referenced aligned color measurements. Alternatively, the information may be transmitted to the color sensing device 12, which may perform processing to utilize the alignment data and referenced aligned color measurements.

In one embodiment, the aforementioned software application that interacts with the cloud service 220 and stores data on the client internet enabled device may be packaged as a software Application Programming Interface (API), and may be made available for use by applications and software developers. If new alignment methods are developed or more reference libraries are added to the cloud database, the cloud service 220 may permit seamless updates of the information stored in the client application, and the API may automatically detect and/or request updates upon internet connectivity or when internet connectivity is present. This allows the device to become "smarter" over its lifetime without the need for recalls or cumbersome device firmware updates.

In another embodiment, all or a portion of alignment operations may be performed by cloud service 220. Rather than relying on a cloud client 210 to perform alignment calculations, it can simply relay raw sensor readings and a unique device ID to the cloud service 220 and allow any or all of the adjustments to be performed remotely in the cloud. Though this requires internet connectivity to receive adjusted scans, this embodiment may be desirable for a number of reasons (e.g., connectivity, distributability, etc.).

In one embodiment, various functionality of their color sensing devices 12 may be restricted (e.g., for security purposes). In one setting, many raw sensor readings may be recorded at a single time, then a request that they be adjusted by many alignment methods at once may be received, the alignment methods may be performed in accordance with any future alignment methods. Allowing all calculations to be performed by the cloud service 220 may require internet connectivity, but also adds many freedoms from the perspective of an end user.

Figure 9:
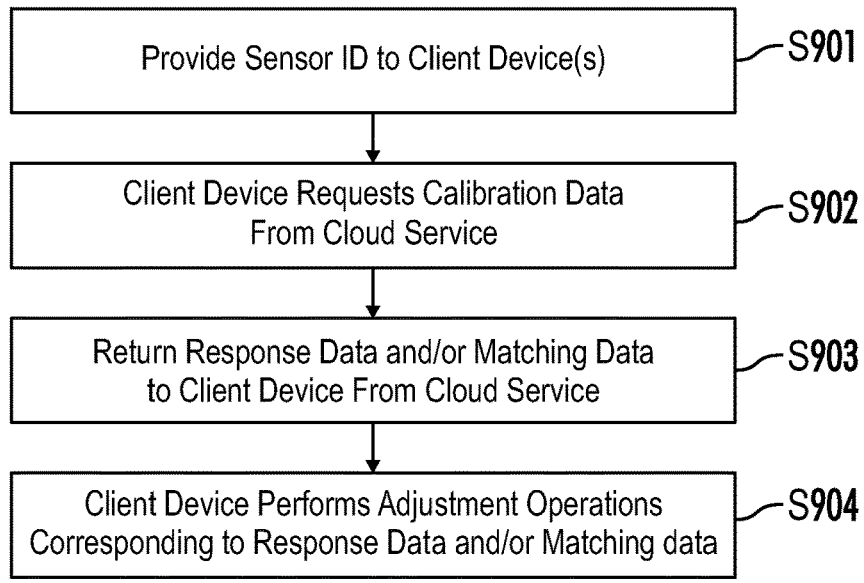
FIG. 9 is a flowchart representing an exemplary method for implementing a cloud service associated with in a color sensing system according to the present disclosure.

FIG. 9 provides an exemplary implementation of a cloud-based system in accordance with the present disclosure. At step S901 a sensor ID is provided to client device(s) for example by a color sensing device 12. As described above, a client device may comprise an internet connected device, a color sensing device 12, or the like or may be a separate device in communication with a color sensing device 12. At step S902 a client device may request calibration data, for example from a cloud service 220. At step S903 response data and/or matching data may be returned to the client device. A client device may perform adjustment operations corresponding to the response data and/or matching data at step S904.

Figure 10:
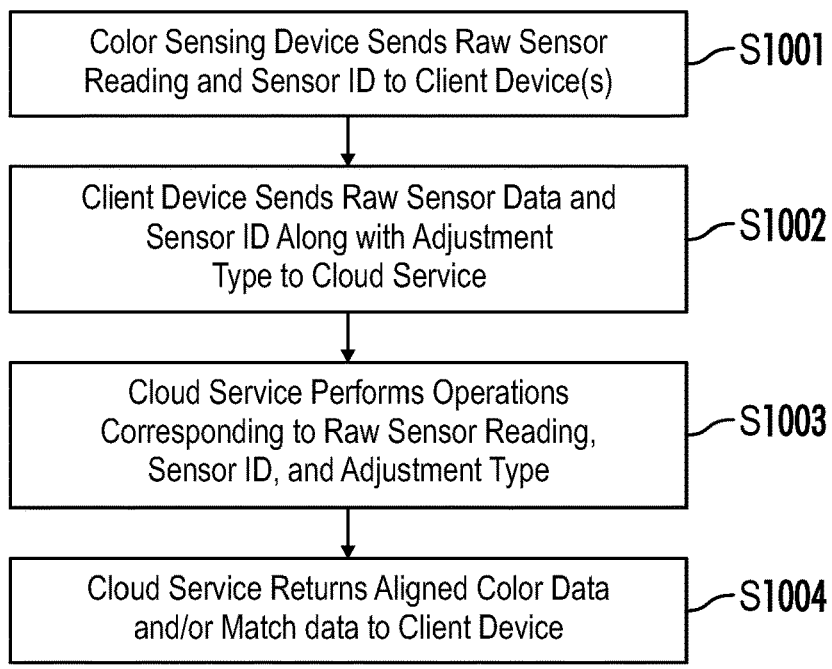
FIG. 10 is a flowchart representing an alternative exemplary method for implementing a cloud service associated with in a color sensing system according to the present disclosure.

FIG. 10 provides another exemplary implementation of a cloud-based system in accordance with the present disclosure. In contrast to the process illustrated by FIG. 9, all alignment may be performed by cloud service 220 in the process illustrated by FIG. 10. At step S1001, a color sensing device 12 sends a raw sensor reading and a sensor ID to a client device. The client device sends the raw sensor data and the sensor ID along with an adjustment type to cloud service 220. At step S1003, the cloud service may perform operations corresponding to raw sensor reading, sensor ID, and/or adjustment type. At step S1004, aligned color data and/or match data may be returned to a client device.

As previously described, an exemplary color sensing method according to the present disclosure may include an algorithm for sensor calibration using a priori estimation. Thanks to the linearity of a color sensing chip used in various exemplary embodiments of the present disclosure (e.g., a Chroma color sensing module), one exemplary embodiment of an a priori sensor calibration algorithm 1100 as represented in FIG. 11 enables the sensor to detect the tristimulus coordinates of colors with an average accuracy of 0.6%.

In accordance with one example of the method 1100, known MacBeth CIE Lab values may be converted to CIE XYZ Tristimulus (XYZ) values, which at this stage may be based on d50 light (step 1101). Chromatic adaptation of these values is performed (step 1102) by converting them to a reference light using a transformation method, for example a Bradford transform as is known in the art (e.g., by conversion to d65 reference light). The color sensing module of the present disclosure then generates raw red, green and blue sensor measurements (step 1103) from a color rendition chart, for example a MacBeth ColorChecker or other color rendition chart used as a calibration target.

The host system may generate a sensor to CIE Tristimulus (XYZ) matrix (step 1104) which may be used for converting future output values from the color sensor into CIE Tristimulus values a priori. For that purpose, the generated tristimulus matrix may be stored to a memory such as, for example, a CryptoAuthentication chip in the color sensing module (step 1105). In an alternate embodiment, the generated tristimulus matrix may be stored using the cloud service 220, as previously described and as illustrated at FIG. 2.

Figure 11:
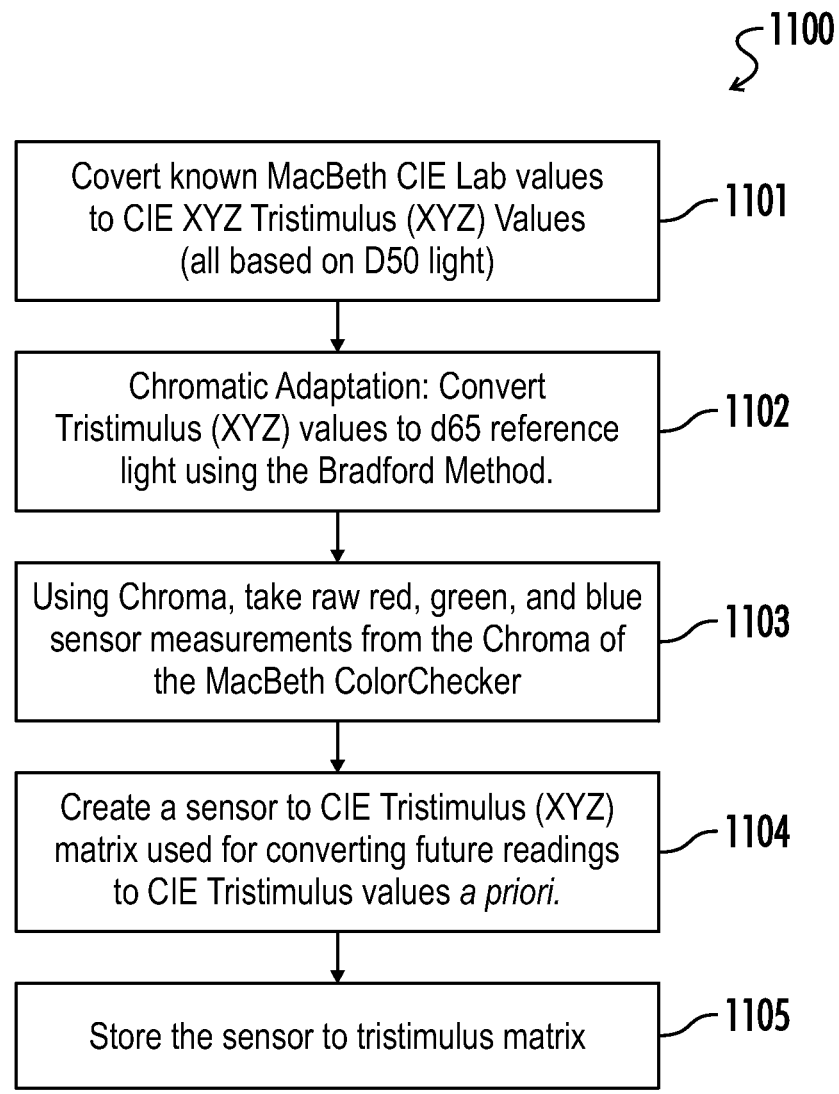
FIG. 11 is a flowchart representing an exemplary calibration method for a color sensing system according to the present disclosure.

After the tristimulus matrix is generated, the process illustrated at FIG. 11 may continue in accordance with the processes described herein and illustrated, for example, by FIGS. 4-10.

In various embodiments, the user may further select one or more of a plurality of lighting conditions, wherein the first and at least second color are displayed in accordance with the selected lighting condition, or only a first color may be displayed in accordance with a plurality of selected lighting conditions, etc.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. In various embodiments, software may be executed by a processor to cause the processor to perform operations. These operations may correspond to algorithms and/or flowcharts illustrated in the figures and described herein.

Various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described various exemplary embodiments set forth herein, it is not intended that such references be construed as limitations upon the scope of this invention except as set forth in the following claims.

What is claimed is:

1. A computer-implemented intelligent alignment method for a color sensing device, the method comprising:
   calibrating the color sensing device by
      obtaining raw sense values measured by the color sensing device with respect to each color in a known set of colors,
      converting the raw sense values to tristimulus values,
   providing a supervised training set associated with the calibrated color sensing device by
      mapping raw readings received from the color sensing device to known tristimulus values,
      converting the mapped values to a standard reference illuminant color space, the calibrated device readings in the standard color space defining unadjusted color readings,
      storing in a database a plurality of unadjusted color readings from the color sensing device and a plurality of reference scans from a specified reference device, and
      establishing a relationship between the color sensing device and the reference device wherein each of the plurality of unadjusted color readings has a corresponding reference scan with less than a maximum allowable ΔE in a same designated color set;
receiving an input comprising a subsequent unadjusted color reading from the color sensing device; and
generating to a user interface of a user computing device an output comprising an adjusted color reading by
executing a K Nearest Neighbor (KNN) algorithm to search for K nearest unadjusted color readings in the database with respect to the received input unadjusted color reading, and
returning a weighted average of the K corresponding reference scans.

2. The method according to claim 1, further comprising:
developing a secondary Artificial Neural Network (ANN) associated with different types of materials and/or surfaces;
operating upon the returned color using the secondary ANN; and
providing an adjusted color based upon a material and/or surface type associated with the secondary ANN.

3. The method according to claim 1, wherein the step of calibrating the color sensing device using a known set of colors further comprises:
transmitting a sensor identification (ID) associated with the color sensing device to a client device;
requesting calibration data associated with the color sensing device to a client-server system;
returning response data or matching data in response to the calibration data request from the client-server system; and
performing adjustment operations corresponding to the response data and/or matching data.

4. The method according to claim 1, wherein the step of calibrating the color sensing device using a known set of colors further comprises:
transmitting a raw sensor reading and a sensor identification (ID) to a client device;
transmitting the raw sensor reading and sensor ID along with an adjustment type to a client-server system;
performing adjustment operations by the client-server system corresponding to the raw sensor reading, sensor ID, and adjustment type; and
returning at least one of aligned color data and match data to the client device.

5. The method according to claim 1, wherein the reference device comprises a spectrometer or spectrophotometer.

6. The method according to claim 1, wherein the reference device comprises at least one other color sensing device having a ΔE value associated with the color sensing device.

7. The method according to claim 1, further comprising:
learning relationships between the mapped raw readings and data associated with the reference device to produce a correlation model; and
adjusting a color reading according to the correlation model.

8. The method of claim 1, wherein said calibration comprises
transmitting a sensor identification (ID) associated with the color sensing device to a client device,
requesting calibration data associated with the color sensing device to a client-server system,
returning response data or matching data in response to the calibration data request from the client-server system, and
performing adjustment operations corresponding to the response data and/or matching data.

9. The method of claim 1, wherein said calibration comprises
transmitting a raw sensor reading and a sensor identification (ID) to a client device,
transmitting the raw sensor reading and sensor ID along with an adjustment type to a client-server system,
performing adjustment operations by the client-server system corresponding to the raw sensor reading, sensor ID, and adjustment type, and
returning at least one of aligned color data and match data to the client device.

10. A client-server system comprising:
a color sensing device; and
one or more servers configured to calibrate the color sensing device by
obtaining raw sense values measured by the color sensing device with respect to each color in a known set of colors, and
converting the raw sense values to tristimulus values;
said one or more servers further configured to provide a supervised training set associated with the calibrated color sensing device by
mapping raw readings received from the color sensing device to known tristimulus values,
converting the mapped values to a standard reference illuminant color space, the calibrated device readings in the standard color space defining unadjusted color readings,
storing in a database a plurality of unadjusted color readings from the color sensing device and a plurality of reference scans from a specified reference device,
establishing a relationship between the color sensing device and the reference device wherein each of the plurality of unadjusted color readings has a corresponding reference scan with less than a maximum permissible ΔE in a same designated color set;
wherein the one or more servers are further configured, responsive to receiving an input comprising a subsequent unadjusted color reading from the color sensing device, to generate an output comprising an adjusted color reading on a user interface associated with a display unit of a user computing device by
executing a K Nearest Neighbor (KNN) algorithm to search for K nearest unadjusted color readings in the database with respect to the received input unadjusted color reading, and
returning a weighted average of the K corresponding reference scans.

11. The system according to claim 10, wherein the operations further comprise:
developing a secondary Artificial Neural Network (ANN) associated with different types of materials and/or surfaces;
operating upon the returned color using the secondary ANN; and
providing an adjusted color based upon a material and/or surface type associated with the secondary ANN.

12. The system according to claim 10, wherein calibrating the color sensing device using a known set of colors further comprises:
transmitting a sensor identification (ID) associated with the color sensing device to a client device;
requesting calibration data associated with the color sensing device to a client-server system;

returning response data or matching data in response to the calibration data request from the client-server system; and performing adjustment operations corresponding to the response data or matching data.

13. The system according to claim 10, wherein calibrating the color sensing device using a known set of colors further comprises:

transmitting a raw sensor reading and a sensor identification (ID) to a client device;

transmitting the raw sensor reading and sensor ID along with an adjustment type to a client-server system;

performing adjustment operations by the client-server system corresponding to the raw sensor data, sensor ID, and adjustment type; and returning at least one of aligned color data and match data to the client device.

14. The system according to claim 10, wherein the reference device comprises at least one other color sensing device having a $\Delta E$ value associated with the color sensing device.

15. The system of claim 10, wherein the operation of calibrating the color sensing device using a known set of colors further comprises:

transmitting a sensor identification (ID) associated with the color sensing device to a client device;

requesting calibration data associated with the color sensing device to a client-server system;

returning response data or matching data in response to the calibration data request from the client-server system; and performing adjustment operations corresponding to the response data or matching data.

16. The system of claim 10, wherein the operation of calibrating the color sensing device using a known set of colors further comprises:

transmitting a raw sensor reading and a sensor identification (ID) to a client device;

transmitting the raw sensor reading and sensor ID along with an adjustment type to a client-server system;

performing adjustment operations by the client-server system corresponding to the raw sensor data, sensor ID, and adjustment type; and returning at least one of aligned color data and match data to the client device.

\* \* \* \* \*